United States Patent
Hanawa et al.

(10) Patent No.: US 12,172,596 B2
(45) Date of Patent: Dec. 24, 2024

(54) AIR BAG DEVICE FOR PEDESTRIAN PROTECTION AND METHOD FOR PRODUCING SAME

(71) Applicant: Autoliv Development AB, Vargarda (SE)

(72) Inventors: Akifumi Hanawa, Kanagawa (JP); Satoshi Ito, Kanagawa (JP); Atsushi Tamura, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/249,905

(22) PCT Filed: Oct. 12, 2021

(86) PCT No.: PCT/JP2021/037748
§ 371 (c)(1),
(2) Date: Apr. 20, 2023

(87) PCT Pub. No.: WO2022/091770
PCT Pub. Date: May 5, 2022

(65) Prior Publication Data
US 2024/0010159 A1 Jan. 11, 2024

(30) Foreign Application Priority Data
Oct. 26, 2020 (JP) ................................. 2020-179225

(51) Int. Cl.
 *B60R 21/36* (2011.01)
 *B60R 21/233* (2006.01)
 *B60R 21/235* (2006.01)
 *B60R 21/34* (2011.01)

(52) U.S. Cl.
 CPC ............ *B60R 21/36* (2013.01); *B60R 21/233* (2013.01); *B60R 2021/23324* (2013.01); *B60R 2021/23533* (2013.01); *B60R 2021/346* (2013.01)

(58) Field of Classification Search
 CPC ..... B60R 21/233; B60R 21/237; B60R 21/36; B60R 2021/23308; B60R 2021/23316;
 (Continued)

(56) References Cited

U.S. PATENT DOCUMENTS 7,243,754 B2 * 7/2007 Mori ....................... B60R 21/36
 180/274
7,584,988 B2 * 9/2009 Okamoto ................ B60R 21/36
 180/274
(Continued)

FOREIGN PATENT DOCUMENTS

JP 2003291756 A * 10/2003 ............. B60R 21/36
JP 2006069291 A * 3/2006
(Continued)

OTHER PUBLICATIONS

Japanese Office Action regarding Patent Application No. 2022558980, dated Aug. 14, 2023.

*Primary Examiner* — Laura Freedman
(74) *Attorney, Agent, or Firm* — Stephen T. Olson

(57) ABSTRACT

An airbag that includes a center chamber extending in a width direction of the vehicle in the vicinity of a lower edge of a windshield, and side chambers extending upward from both left and right end sections of the center chamber at least along an A-pillar, and is configured such that gas supplied from the inflator flows from the center chamber to the side chamber, a folded section is formed at which the side chamber is folded back toward the center chamber to be overlapped in a stowed state of the airbag, a pair of left and right partition panels for partitioning the center chamber and
(Continued)

the side chambers are provided in the vicinity of the folded sections, and each of the pair of partition panels is provided with a check valve that prevents backflow of gas from the side chamber to the center chamber.

12 Claims, 7 Drawing Sheets

(58) Field of Classification Search
CPC .......... B60R 2021/23324; B60R 2021/23382; B60R 2021/23533; B60R 2021/26058; B60R 2021/26094; B60R 2021/346
See application file for complete search history.

(56) References Cited

U.S. PATENT DOCUMENTS

| | | | | |
|---|---|---|---|---|
| 7,845,454 | B2* | 12/2010 | Takimoto | B60R 21/2338 180/274 |
| 8,302,989 | B2* | 11/2012 | Takimoto | B60R 21/36 180/274 |
| 8,985,257 | B2* | 3/2015 | Tanaka | B60R 21/36 180/274 |
| 9,346,432 | B2* | 5/2016 | Sugimoto | B60R 21/36 |
| 9,809,190 | B2* | 11/2017 | Mazanek | B60R 21/237 |
| 10,507,788 | B2* | 12/2019 | Minei | B60R 21/36 |
| 2013/0133971 | A1 | 5/2013 | Rick | |
| 2014/0291054 | A1* | 10/2014 | Tanaka | B60R 21/36 180/274 |
| 2016/0339866 | A1* | 11/2016 | Pieruch | B60R 21/231 |

FOREIGN PATENT DOCUMENTS

| | | | |
|---|---|---|---|
| JP | 2006088923 A | * | 4/2006 |
| JP | 2006-219046 A | | 8/2006 |
| JP | 2007-216938 A | | 8/2007 |
| JP | 2014-196064 A | | 10/2014 |
| JP | 2015-44508 A | | 3/2015 |
| JP | 2019-151203 A | | 9/2019 |

* cited by examiner (A)

A-A cross section (B)

B-B cross section (A) Folding in longitudinal direction (B) Roll in longitudinal direction (A)

Roll in longitudinal direction (B)

Fold in lateral direction

AIR BAG DEVICE FOR PEDESTRIAN PROTECTION AND METHOD FOR PRODUCING SAME

TECHNICAL FIELD

The present invention relates to a pedestrian protection airbag device for protecting a pedestrian or a cyclist who collides with a vehicle, and a method of manufacturing the same.

BACKGROUND ART

In order to protect occupants in the event of a vehicle collision, it is well known that vehicles are equipped with one or a plurality of airbags. These airbags include, for example, various forms such as: a so-called driver airbag which expands from near the center of the steering wheel of an automobile so as to protect a driver; a curtain airbag which deploys downward along an inner side of a window of the automobile so as to protect an occupant during a collision in a lateral direction of the vehicle, as well as when overturning and during a rollover accident; and a side airbag which is deployed between an occupant and a side panel so as to protect the occupant upon impact in the lateral direction of the vehicle. In addition, there is also a pedestrian protection airbag for protecting a pedestrian or a cyclist (a person riding a bicycle) who collides with a vehicle.

A pedestrian protection airbag device includes a center chamber extending in a lateral direction (vehicle width direction) in the vicinity of a boundary between a hood and a windshield of a vehicle, and side chambers deployed upward from left and right end sections of the center chamber so as to cover an A-pillar. With an airbag device having such a structure, since the shape of the airbag is substantially U-shaped, the side chamber may oscillate (flutter) to the left and right when the airbag is deployed. In other words, the deployment behavior of the airbag is not stable, and rapid and sure protection of the pedestrian (or the cyclist) is difficult.

Therefore, for example, a center chamber and side chambers connected by a strap has been proposed, as in Patent Document 1. However, there is risk that the strap may be caught on the neck of the pedestrian or cyclist during collision with the vehicle.

RELATED ART DOCUMENTS

Patent Documents

Patent Document 1: Japanese Unexamined Patent Application 2006-219046

SUMMARY OF THE INVENTION

Problem to be Solved by the Invention

In light of the foregoing, an object of the present invention is to provide a pedestrian protection airbag capable of safely stabilizing deployment behavior of the airbag, and a manufacturing method thereof.

Means to Solve the Problem

In order to resolve the problem described above, the present invention is a pedestrian protection airbag device including:

an inflator that supplies expansion gas; and
an airbag that is expanded and deployed by the expansion gas for protecting a pedestrian who collides with a vehicle; wherein
the airbag includes a center chamber extending in a width direction of the vehicle in the vicinity of a lower edge of a windshield, and side chambers extending upward from both left and right end sections of the center chamber at least along an A-pillar, and is configured such that gas supplied from the inflator flows from the center chamber to the side chamber,
a folded section is formed where the side chamber is folded back toward the center chamber so as to be overlapped in a stowed state of the airbag,
a pair of left and right partition panels for partitioning the center chamber and the side chambers are provided in the vicinity of the folded sections, and
each of the pair of partition panels is provided with a check valve that prevents backflow of gas from the side chamber to the center chamber.

Here, subjects to be protected by the present invention include not only "pedestrians" but also persons riding bicycles (cyclists).

Further, the "windshield" may be referred to as a front glass. There is a description "the side chamber extends upward at least along an A-pillar;" however, in addition to the region covering the A-pillar, the side chamber and vicinity of the connecting section with the center chamber can include a section extending in the width direction of the vehicle.

In the present invention, since the partition panel having the check valve is provided in the vicinity of the folded section between the center chamber and the side chamber, and the side chamber is folded toward the center chamber (center direction) in the vicinity of the folded section, when the airbag starts to deploy, the center chamber first expands and deploys in the front-to-back direction (longitudinal direction). At this time, the side chamber is maintained in a folded state. Thereafter, the expansion gas from the center chamber flows into the side chamber through the check valve of the partition panel, such that the folded section unfolds and the side chamber deploys. Gas flowing into the side chamber does not flow back toward the center chamber due to the effect of the check valve. As described above, in the present invention, a stable base is first established by the center chamber, and then the side chambers are deployed; therefore, the deployment behavior of the airbag (particularly, the side chambers) is stabilized.

The inflator may be provided and stowed in the vicinity of the center in the left-right direction of the center chamber. Alternatively, a plurality of the inflators can be provided, and the plurality of inflators may be arranged and stowed inside the center chamber, aligned in the left-right direction.

When the side chamber is folded back at the folded section, end sections of the pair of left and right side chambers can be configured to overlap each other.

The airbag can be configured such that after a section corresponding to the center chamber is formed into a roll shape, the side chambers on both left and right sides are folded toward the center side in the vicinity of the folded section.

The airbag can be configured to include a lateral tether extending along a longitudinal direction of the center chamber inside the airbag that is capable of restricting the thickness of the airbag at the time of deployment and with the pair of partition panels arranged in the vicinity of both left and right ends of the lateral tether.

As described above, the deployed shape of the center chamber in the left-right width direction (lateral direction) is stabilized by the presence of the lateral tether, and as a result, the deployment behavior of the side chamber that deploys after the center chamber is stabilized.

Another aspect of the present invention is a method of manufacturing the pedestrian protection airbag device including the inflator that supplies expansion gas and the airbag that is expanded and deployed by the expansion gas to protect a pedestrian who collides with the vehicle. The airbag includes a center chamber extending in a width direction of the vehicle in the vicinity of a lower edge of a windshield, and side chambers extending upward from both left and right end sections of the center chamber at least along an A-pillar, and is configured such that gas supplied from the inflator flows from the center chamber to the side chamber. The method according to the present invention includes a step of setting a folded section between the side chamber and the center chamber of the airbag, a step of providing a pair of left and right partition panels in the vicinity of the folded section for partitioning the center chamber and the side chamber, and a step of folding and overlapping the side chamber toward the center chamber at the folded section.

In the specification and claims of the present application, the direction in which the occupant is facing (the direction of vehicle travel) when the occupant is seated in the seat in a normal posture is referred to as "forward" and the opposite direction is referred to as "rear", and the axis of the coordinates are referred to as the "front-rear direction". Moreover, when the passenger is seated in the seat in a regular posture, the right of the passenger is referred to as the "right direction," the left of the passenger is referred to as the "left direction," and the direction indicating the coordinate axis is referred to as the "left and right direction" or "left-right width direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

BRIEF DESCRIPTION OF THE DRAWINGS

FIG. 7(A) is a plan view illustrating a state of the airbag spread out. FIG. 7(B) is a cross-sectional view illustrating a state of after the airbag is compressed.

DESCRIPTION OF THE PREFERRED EMBODIMENTS

A side airbag device according to embodiments of the present invention will be described below with reference to the accompanying drawings.

Figure 1:
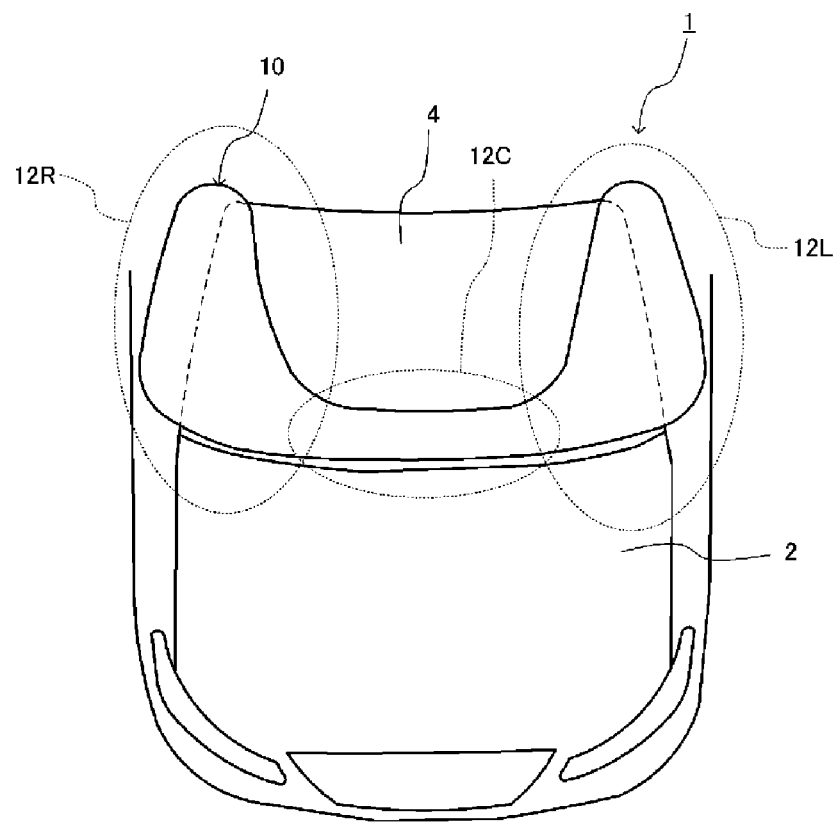
FIG. 1 is an explanatory diagram illustrating the activated (deployed) state of a pedestrian protection airbag device according to the present invention.
Figure 1:
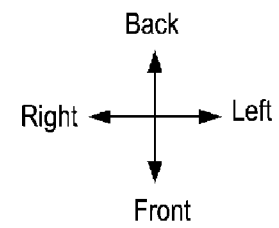

FIG. 1 is an explanatory diagram illustrating the activated (deployed) state of a pedestrian protection airbag device 1 according to the present invention.

Figure 2:
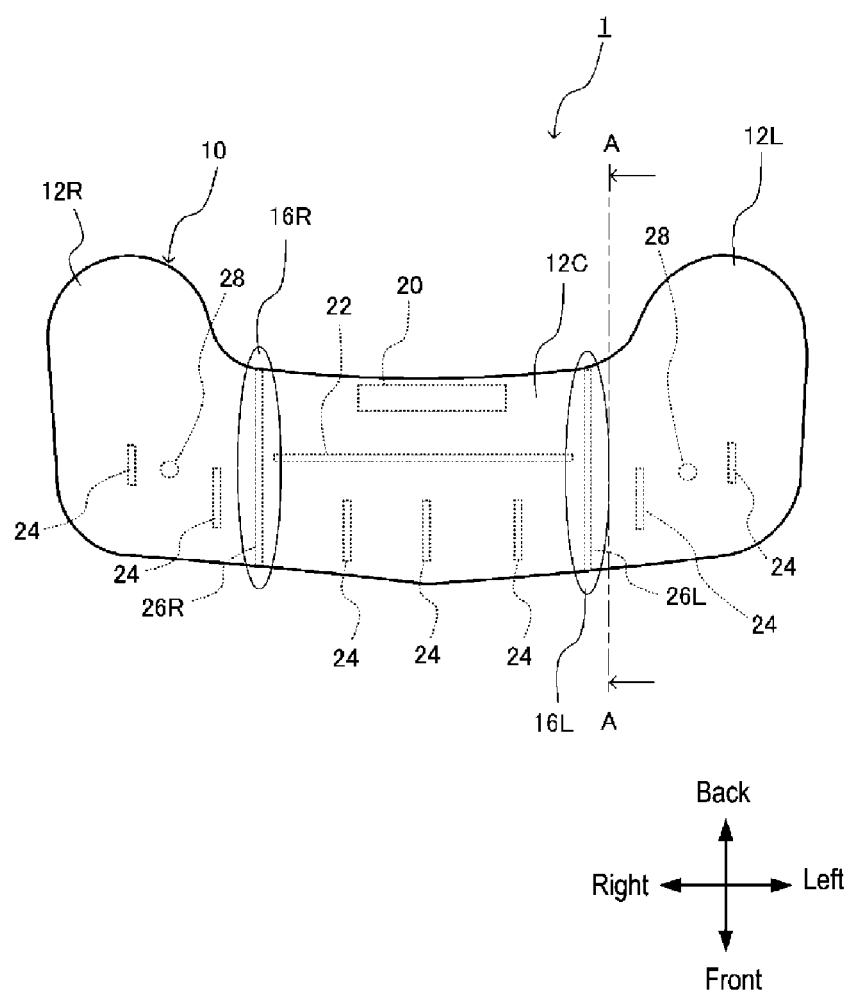
FIG. 2 is a plan view illustrating a structure of a pedestrian protection airbag device according to the present invention.
Figure 3:
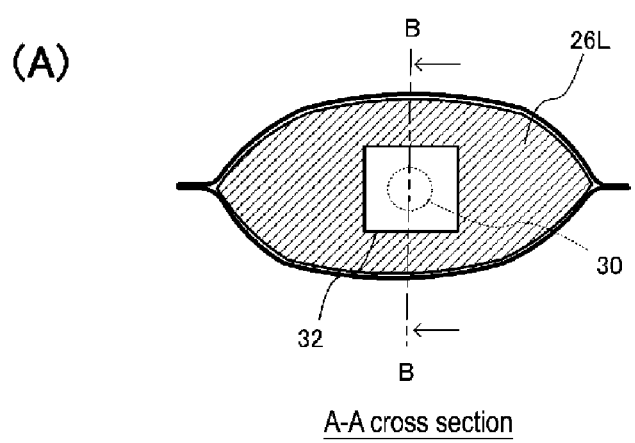
FIG. 3(A) is a cross-sectional view taken along line A-A in FIG. 2.
FIG. 3(B) is a cross-sectional view taken along line B-B in FIG. 3(A).
Figure 3:
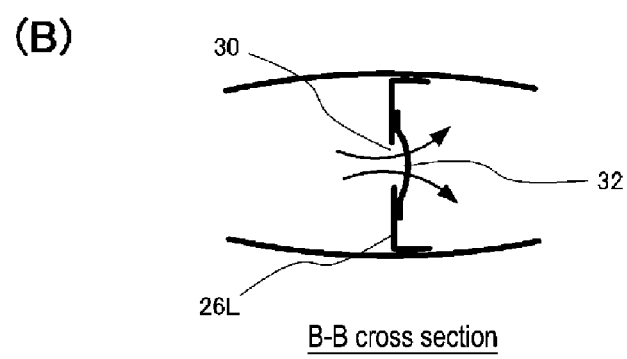

FIG. 2 is a plan view illustrating a structure of a pedestrian protection airbag device 1 according to the present invention. FIG. 3(A) is a cross-sectional view taken along line A-A in FIG. 2. FIG. 3(B) is a cross-sectional view taken along line B-B in FIG. 3(A).

The pedestrian protection airbag device 1 according to the present invention includes an inflator 20 (FIG. 2) that supplies expansion gas, and an airbag 10 that is expanded and deployed by the expansion gas to protect a pedestrian who collides with a vehicle. The airbag 10 includes a center chamber 12C extending in the vehicle-width direction in the vicinity of the lower edge of a windshield 4, and side chambers 12R and 12L extending upward at least along the A-pillar from both left and right end parts of the center chamber 12C. The gas supplied from the inflator 20 flows from the center chamber 12C to the side chambers 12R and 12L.

As will be described in detail below, the side chambers 12R and 12L are configured to be folded back to the center chamber 12C side (center side) in the vicinity of folded sections 16R and 16L with respect to the center chamber 12C and overlapped with each other. In addition, a pair of left and right partition panels 26R and 26L for partitioning the center chamber 12C and the side chambers 12R and 12L are provided in the vicinity of the folded sections 16L and 16R between the center chamber 12C and the side chambers 12R and 12L, and the partition panels 26R and 26L are provided with check valves (30, 32) for preventing backflow of gas from the side chambers 12R and 12L to the center chamber 12C.

As illustrated in FIG. 2, a plurality of longitudinal tethers 24 extending in the front-to-back direction are provided inside the center chamber 12C and the side chambers 12R and 12L, so that the thickness of the deployed airbag 10 can be regulated. The vertical tether 24 is sewn so as to connect between two front and back panels forming the airbag 10, and an opening (not shown) through which expansion gas passes is formed in the middle of the vertical tether 24. Reference code 28 denotes a sewn section for directly connecting the two front and back panels.

Inside the center chamber 12C, a lateral tether 22 is provided which extends along the longitudinal direction (left-right direction) of the center chamber 12C and is capable of restricting the thickness of the airbag 10 when deployed. Similar to the longitudinal tether 24, the lateral tether 22 is also sewn so as to connect the two front and back panels forming the airbag 10, and an opening (not shown) through which the expansion gas passes is formed in the middle of the lateral tether 22. By arranging the lateral tether 22 at a position relatively close to the inflator 20, the gas discharged from the inflator 20 rapidly flows in the left-right direction, and the left-right width direction of the center chamber 12C is set early, thereby contributing to the stabilization of the deployment behavior of the airbag 10.

As illustrated in FIG. 2, the pair of left and right partition panels 26R and 26L are respectively arranged in the vicinity of the left and right ends of the lateral tether 22.

The inflator 20 is a cylindrical inflator, and is stowed in the vicinity of the center in the left-right width direction of the center chamber 12C.

FIGS. 3(A) and 3(B) illustrate the structure around the partition panel 26L. Since the partition panel 26R has the same structure, only the partition panel 26L will be described. In addition, the partition panel 26L is hatched in order to clearly distinguish it from other structures. An opening 30 through which gas passes is formed near the center of the partition panel 26L, and a flexible membrane 32 is provided so as to cover the opening 30 on a side panel 12 side. The opening 30 and the membrane 32 form the check valve.

Method of Manufacturing the Airbag Device

Figure 4:
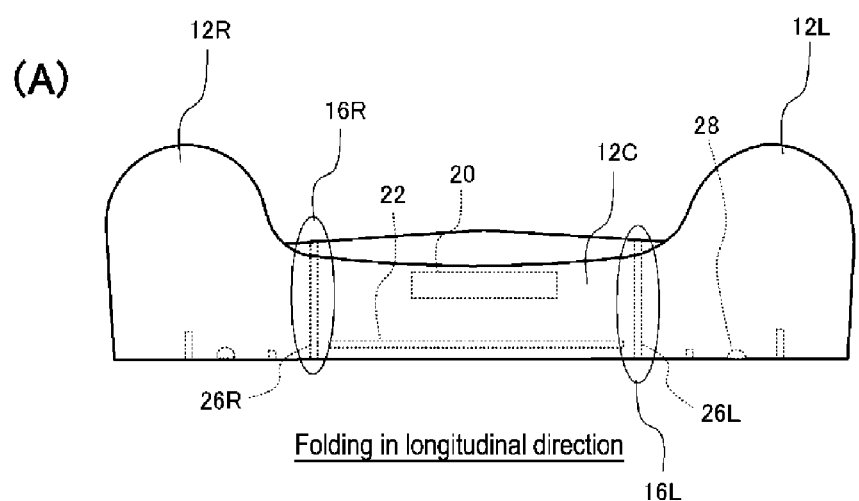
FIGS. 4(A) and 4(B) are plan views illustrating a method of manufacturing the pedestrian protection airbag device (method of compressing the airbag) according to the present invention.
Figure 4:
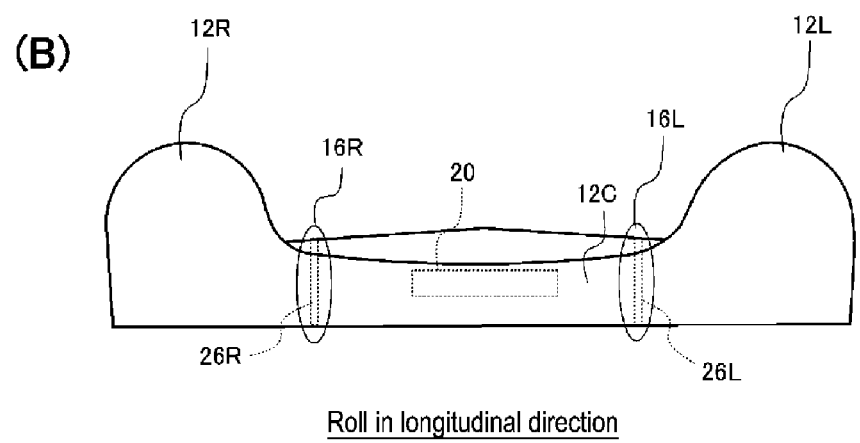
Figure 5:
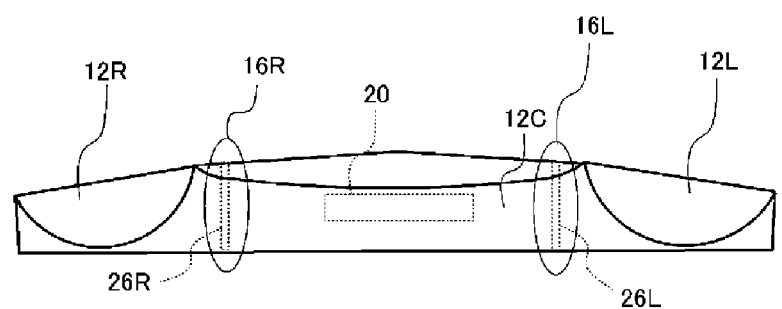
FIGS. 5(A) and 5(B) are plan views illustrating a method of manufacturing the pedestrian protection airbag device (method of compressing the airbag) according to the present invention.
Figure 5:
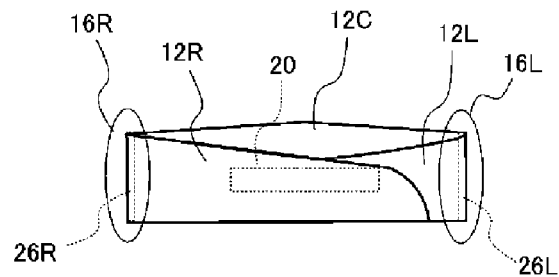

FIGS. 4(A) and 4(B) as well as FIGS. 5(A) and 5(B) are plan views illustrating a manufacturing process (airbag 10 compressing process) of the pedestrian protection airbag device 1 according to the present invention. When the airbag 10 according to the present invention is folded and compressed from the state in FIG. 2, the front section of the airbag 10 is first folded in the longitudinal direction (front-to-back direction) as illustrated in FIG. 4(A).

Next, as illustrated in FIG. 4(B), the front section of the airbag 10 is rolled rearward in the longitudinal direction (front-to-back direction).

Next, as illustrated in FIG. 5(A), the airbag 10 is further rolled, and the upper end sections of the side chambers 12R and 12L are folded downward (forward).

Thereafter, as illustrated in FIG. 5(B), the locations corresponding to the partition panels 26R and 26L are set as folded sections (16L and 16R) and the sections corresponding to the side chambers 12R and 12L are folded back toward the center chamber 2C [sic] side (center side); thereby achieving a stowed state.

(Effect of the Present Invention: Airbag Deployment Behavior)

Figure 6:
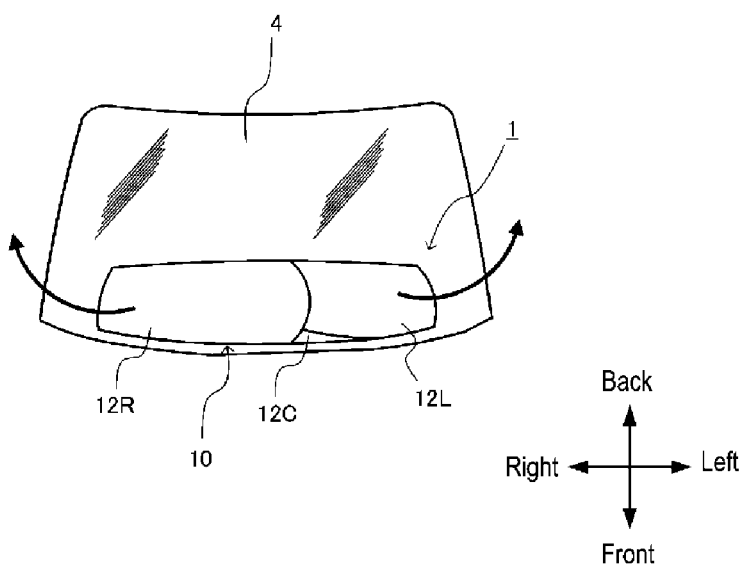
FIGS. 6(A) and 6(B) are explanatory diagrams (plan views) illustrating deployment behavior of the pedestrian protection airbag according to the present invention.
Figure 6:
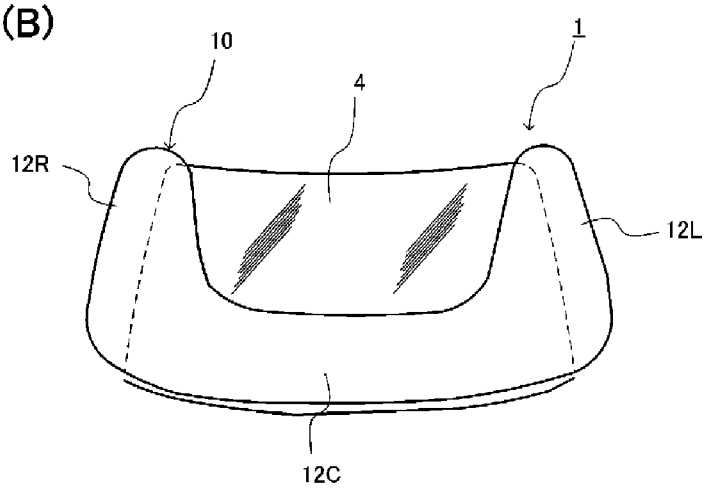

FIGS. 6(A) and 6(B) are explanatory diagrams (plan views) illustrating deployment behavior of the pedestrian protection airbag according to the present invention. When the airbag 10 starts to deploy, as illustrated in FIG. 6(A), only the center chamber 12C is first expanded and deployed. In the present invention, the partition panels 26R and 26L having the check valves (30 and 32) are provided in the vicinity of the folded sections 16L and 16R between the center chamber 12C and the side chambers 12R and 12L, and the side chambers 12R and 12L are folded to the center chamber 12C side (center direction) of the vicinity of the folded sections. Therefore, when the airbag 10 starts to deploy, first the center chamber 12C expands and deploys in the front-to-back direction (longitudinal direction). At this time, the side chambers 12R and 12L maintain a folded state.

Thereafter, the expansion gas from the center chamber 12C flows through the check valves (30 and 32) of the partition panels 26R and 26L into the side chambers 12R and 12L, and as illustrated in FIG. 6(B), the folded sections are unfolded, and the side chambers 12R and 12L are deployed. The gas flowing into the side chambers 12R and 12L does not flow back to the center chamber 12C side due to the effect of the check valves (30 and 32).

As described above, in the present invention, since a stable base is first constructed by means of the center chamber 12C and then the side chambers 12R and 12L are deployed, the deployment behavior of the airbag 10 (in particular, the side chambers 12R and 12L) is stabilized.

In addition, due to the presence of the lateral tether 22, the deployment form of the center chamber 12C in the left-right width direction (lateral direction) is stabilized, and as a result, the deployment behavior of the side chambers 12R and 12L that are deployed following the center chamber 12L is stabilized.

Other Embodiments of the Invention

Figure 7:
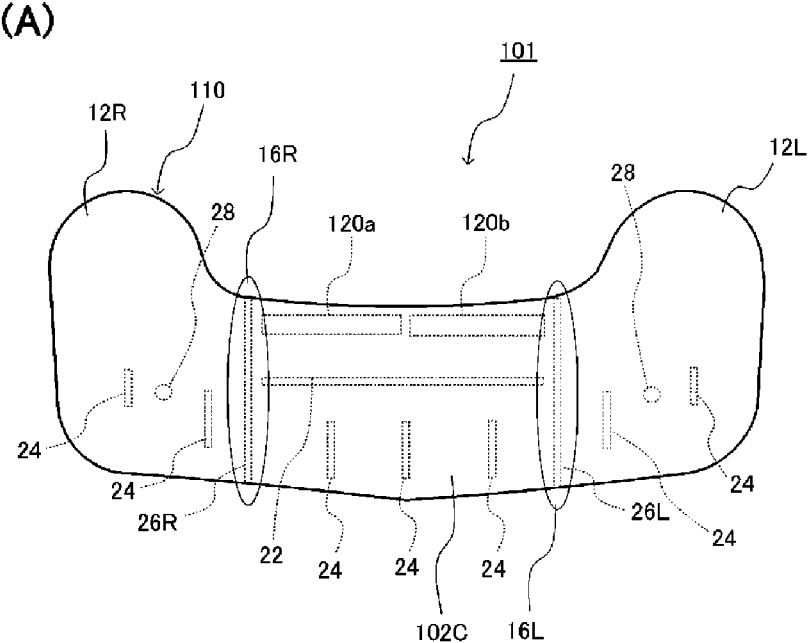
FIG. 7 illustrates the pedestrian protection airbag device according to another embodiment of the present invention.
Figure 7:
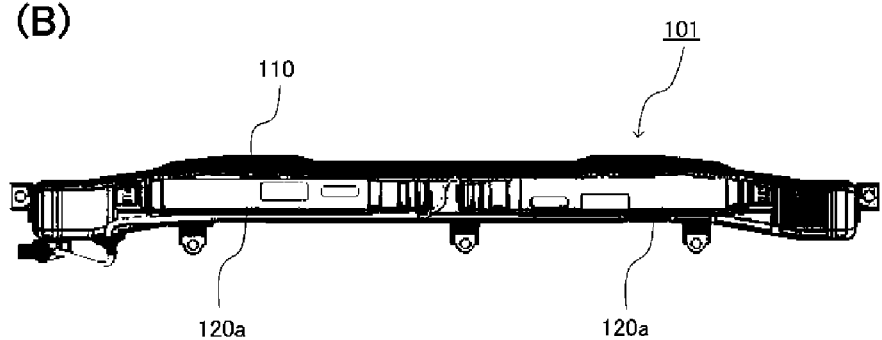

FIG. 7 illustrates a pedestrian protection airbag device 101 according to another embodiment of the present invention. FIG. 7(A) is a plan view illustrating a state of an airbag 110 spread out. FIG. 7(B) is a cross-sectional view illustrating a state of after the airbag 110 is compressed. Note that the same reference codes are used for structural elements that are the same or similar to those in previously described embodiments, and redundant descriptions are omitted.

In the airbag device 101 according to the present embodiment, two inflators 120a and 120b are stowed in a center chamber 102C of the airbag 110. The two inflators 120a and 120b are arranged and stowed so as to be lined up in a line in the left-right direction inside the center chamber 102C.

Although the present invention has been described with reference to embodiments, the present invention is not limited in any way to these embodiments, and can be changed as appropriate within the scope of the technical concept of the present invention.

The invention claimed is:

1. A pedestrian protection airbag device comprising:
an airbag for expansion and deployment for protecting a pedestrian from a collision with a vehicle;
wherein:
the airbag includes a center chamber for extending in a width direction of the vehicle proximate a lower edge of a windshield, and first and second side chambers for respectively extending upward from both left and right end sections of the center chamber at least along a respective A-pillar of the vehicle, and is configured such that gas supplied from at least one inflator flows from the center chamber to the first and second side chambers,
left and right partition panels, the left and right partition panels both extend completely from a back side of the airbag to a front side of the airbag,
a first folded section having a first location corresponding with the left partition panel, the first side chamber folded back at the first folded section toward the center chamber, and
a second folded section having a second location corresponding with the right partition panel, the second side chamber folded back toward the center chamber in a stowed state of the airbag,
wherein in the stowed state of the airbag, the first side chamber and the second side chamber both overlap the center chamber and the first and second side chambers overlap each other,
wherein the left and right partition panels partition the center chamber and the first and second side chambers proximate the first and second folded sections, respectively, and
wherein in the stowed state of the airbag, a front section of the airbag is folded in a longitudinal direction, the longitudinal direction extending in a front-to-back direction of the airbag, the front section of the airbag is rolled rearward in the longitudinal direction, and upper sections of the first and second side chambers are folded forward.

2. The pedestrian protection airbag device according to claim 1, wherein the pedestrian protection airbag device includes at least one inflator and the at least one inflator is arranged and stowed proximate to a center of the center chamber in a left-right direction.

3. The pedestrian protection airbag device according to claim 1, further comprising a plurality of inflators, the plurality of inflators arranged and stowed lined up in a line in a left-right direction inside the center chamber.

4. The pedestrian protection airbag device according to claim 1, wherein the airbag is configured such that a section corresponding to the center chamber is formed into a roll shape, and then the side chambers on both left and right sides are folded back toward a center side proximate to the first and second folded sections.

5. The pedestrian protection airbag device according to claim 1, wherein the airbag includes a lateral tether that extends in a longitudinal direction of the center chamber inside the airbag, the left and right partition panels are respectively arranged at left and right ends of the lateral tether.

6. The pedestrian protection airbag device according to claim 1, wherein the first and second side chambers both extend in a rearward direction farther than both of the left and right partition panels.

7. The pedestrian protection airbag device according to claim 1, further comprising a lateral tether extending in a longitudinal direction of the center chamber inside the airbag, the left and right partition panels are respectively arranged at left and right ends of the lateral tether.

8. The pedestrian protection airbag device according to claim 1, wherein the left and right partition panels are folded back toward the center chamber in the stowed state of the airbag.

9. The pedestrian protection airbag device according to claim 1, wherein each of the left and right partition panels is provided with a check valve for preventing a backflow of gas from the first and second side chambers to the center chamber.

10. The pedestrian protection airbag device according to claim 9, wherein the check valve for both of the left and right partition panels includes a flexible membrane on a side panel side of an opening.

11. A method of manufacturing a pedestrian protection airbag device including an inflator that supplies expansion gas and an airbag that is expanded and deployed by the expansion gas to protect a pedestrian who collides with a vehicle, the method comprising:

preparing the airbag containing a center chamber extending in a width direction of the vehicle near a lower edge of a windshield and first and second side chambers respectively extending upward from both left and right end sections of the center chamber at least along a respective A-pillar of the vehicle, the first and second side chambers separated from the center chamber by left and right partition panels, respectively, the airbag configured such that gas supplied from the inflator flows from the center chamber to the first and second side chambers;

setting a first folded section between the first side chamber and the center chamber of the airbag;

setting a second folded section between the second side chamber and the center chamber of the airbag;

and folding back and overlapping the first and second side chambers at first and second locations corresponding with the first and second partition panels, respectively, toward the center chamber, wherein the left and right partition panels both extend from a back side of the airbag to a front side of the airbag, and wherein the method further includes before the folding back and overlapping the first and second side chambers:

first folding a front section of the airbag in a longitudinal direction corresponding with a front-to-back direction;

next, rolling the front section of the airbag in the longitudinal direction; and folding upper sections of the first and second side chambers forward.

12. The method of manufacturing the pedestrian protection airbag device according to claim 11, wherein a section of the airbag corresponding to the center chamber is formed into a roll shape.

* * * * *